(12) United States Patent
Lee (10) Patent No.: US 9,866,890 B2
(45) Date of Patent: Jan. 9, 2018

(54) METHOD AND APPARATUS FOR PROVIDING LINKING SERVICE BETWEEN VEHICLE AVN SYSTEM AND SMARTPHONE BASED ON VIRTUALIZATION FRAMEWORK

(71) Applicant: Hyundai Motor Company, Seoul (KR)

(72) Inventor: Seung Cheol Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/996,752

(22) Filed: Jan. 15, 2016

(65) Prior Publication Data

US 2017/0134788 A1    May 11, 2017

(30) Foreign Application Priority Data

Nov. 10, 2015  (KR) ......................... 10-2015-0157117

(51) Int. Cl.
*H04N 7/18* (2006.01)
*H04N 21/414* (2011.01)
(Continued)

(52) U.S. Cl.
CPC ... *H04N 21/41422* (2013.01); *G06F 9/45545* (2013.01); *G06F 9/45558* (2013.01);
(Continued)

(58) Field of Classification Search
CPC .......... H04N 21/4437; H04N 21/41422; G06F 9/45533; G06F 9/45541; G06F 9/45545; G06F 9/5077
See application file for complete search history.

(56) References Cited

U.S. PATENT DOCUMENTS

| 8,613,070 B1* | 12/2013 | Borzycki ............ G06F 21/6218 726/8 |
| 2012/0084480 A1 | 4/2012 | Reeves et al. |
| 2013/0167159 A1 | 6/2013 | Ricci et al. |

FOREIGN PATENT DOCUMENTS

| JP | 2003-036174 A | 2/2003 |
| JP | 2012-531678 A | 12/2012 |

(Continued)

OTHER PUBLICATIONS

Mentor Graphics,"Infotainment and Telematics Solutions with Renesas R-Car", DevCon Oct. 2012.*

(Continued)

*Primary Examiner* — James R Marandi
(74) *Attorney, Agent, or Firm* — Brinks Gilson & Lione (57) ABSTRACT

Disclosed are a method and apparatus for providing a linking service between a vehicle AVN system and a smartphone based on a virtualization framework. An apparatus for providing a linking service between a vehicle audio video navigation (AVN) system and a smartphone, includes a host operating system for managing an operation and a state of a host process and AVN application, and managing hardware resources included in the apparatus for the host process and AVN application, a guest operating system for managing an operation and a state of a guest process/the smartphone linkage application, and a hypervisor for emulating the hardware resources according to a control signal of the host operating system to allocate a virtualized hardware resource to the guest operating system. Therefore, the present disclosure has an advantage of continuously providing an existing AVN function irrespective of an error of a function of linking a vehicle AVN system and a smartphone.

12 Claims, 8 Drawing Sheets

(51) Int. Cl.
  *G06F 9/50*    (2006.01)
  *H04N 21/41*   (2011.01)
  *H04N 21/443*  (2011.01)
  *H04N 21/81*   (2011.01)
  *H04W 88/04*   (2009.01)
  *G06F 9/455*   (2006.01)

(52) U.S. Cl.
  CPC ....... *G06F 9/5077* (2013.01); *H04N 21/4126* (2013.01); *H04N 21/4437* (2013.01); *H04N 21/8173* (2013.01); *H04W 88/04* (2013.01); *G06F 9/45533* (2013.01); *G06F 9/45541* (2013.01); *G06F 2009/45579* (2013.01)

(56) References Cited

FOREIGN PATENT DOCUMENTS

| | | |
|---|---|---|
| JP | 2015-103129 | 6/2015 |
| JP | 2015-103129 A | 6/2015 |
| KR | 10-1027415 B1 | 4/2011 |
| KR | 10-2012-0115827 | 10/2012 |
| KR | 10-1326908 B1 | 11/2013 |
| KR | 10-2014-0021042 A | 2/2014 |
| KR | 10-2015-0111609 | 10/2015 |
| KR | 20150111609 A * | 10/2015 |

OTHER PUBLICATIONS

Chung et al., "Isolating system Faults on Vehicular Network Gateways Using Virtualization", IEEE/IFIP 2010.*

* cited by examiner

FIG. 1

PRIOR ART

FIG. 2

PRIOR ART

METHOD AND APPARATUS FOR PROVIDING LINKING SERVICE BETWEEN VEHICLE AVN SYSTEM AND SMARTPHONE BASED ON VIRTUALIZATION FRAMEWORK

CROSS-REFERENCE TO RELATED APPLICATION

This application claims the benefit of Korean Patent Application No. 10-2015-0157117, filed on Nov. 10, 2015, which is hereby incorporated by reference as if fully set forth herein.

FIELD

The present disclosure relates to a method of linking a vehicle audio video navigation (AVN) system with an external device, and more particularly, to a method and apparatus for providing a linking service between a vehicle AVN system and a smartphone based on a virtualization framework.

BACKGROUND

The statements in this section merely provide background information related to the present disclosure and may not constitute prior art.

Various technologies have recently been developed to link a smartphone with a vehicle head unit or an audio video navigation (AVN) system installed in a vehicle.

For example, a smartphone manufacturer, Apple and an Android OS provider, Google have recently launched CarPlay and Google Android Auto, respectively, corresponding to individual standards. As a result, a user can use a display of a vehicle head unit through a second display of a smartphone by connecting the smartphone, which has iOS or Android OS, to the vehicle head unit by wire.

In addition, application of MirrorLink solution led by the Car Connective Consortium has been gradually extended by several original equipment manufacturers (OEMs). In China, a function of linking a vehicle AVN system and a smartphone has been individually standardized by leading information technology (IT) companies such as Baidu, Tencent, etc., and the function has been developed.

The function of linking the vehicle AVN system and the smartphone allows various applications of the smartphone to be conveniently used in a vehicle, allows applications suitable for the vehicle to be distributed through the ecosystem previously constructed by Apple/Google/Baidu, etc., and allows the applications to be frequently updated. Thus, it is possible to effectively overcome problems of the absence of the ecosystem, restriction on upgrade and connection, etc. that a conventional vehicle has had. Therefore, the function of linking the vehicle AVN system and the smartphone is expected to be a technology that can complement marketability of a vehicle AVN system which can lag behind a conventional IT product.

However, a currently released function of linking a vehicle AVN system and a smartphone has been generally developed such that a standard technical specification of each company is satisfied by distributing a software (SW) plug-in which operates in the vehicle AVN system by Apple/Google, etc. and mounting the SW plug-in in the vehicle AVN system even though the function is different between respective implementation entities.

However, when the function of linking the AVN system and the smartphone, which is different from a basic function of the AVN system, is implemented, the functions may collide with each other. In addition, when the SW plug-in distributed by Apple/Google, etc. is applied to the AVN system, there is a problem of many errors due to different internal configurations.

Moreover, when code is counterfeited or falsified by a malicious hacker in a process of distributing SW of Apple/Google, etc., there is a more serious problem in that code having a potential security risk is installed in the AVN system, and thus vehicle security risk increases.

Figure 1:
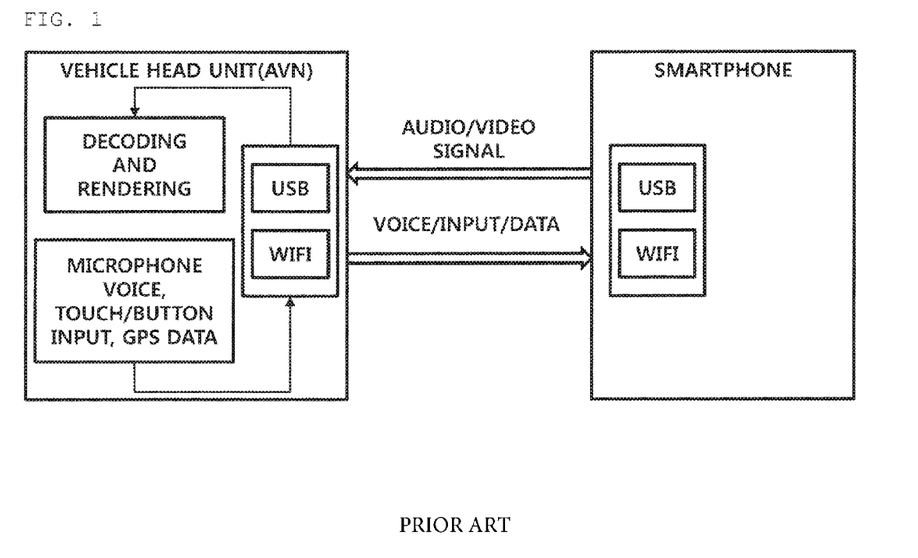
FIG. 1 is a block diagram illustrating a configuration of a system for linking a vehicle AVN system and a smartphone according to the related art.

As illustrated in FIG. 1, according to a current technology of linking a smartphone and a vehicle AVN system, the smartphone and the vehicle AVN system are connected to each other using a physical communication means such as a universal serial bus (USB) or Wi-Fi, and the vehicle AVN system decodes, renders, and outputs received data such as video or audio when the smartphone transmits the data. In addition, the vehicle AVN system may transmit, to the smartphone, input data input through an included input means such as a touch screen, a key button, etc., audio data for voice recognition, handoff, etc., positioning data acquired through a global positioning system (GPS) module included in the AVN system, etc.

Figure 2:
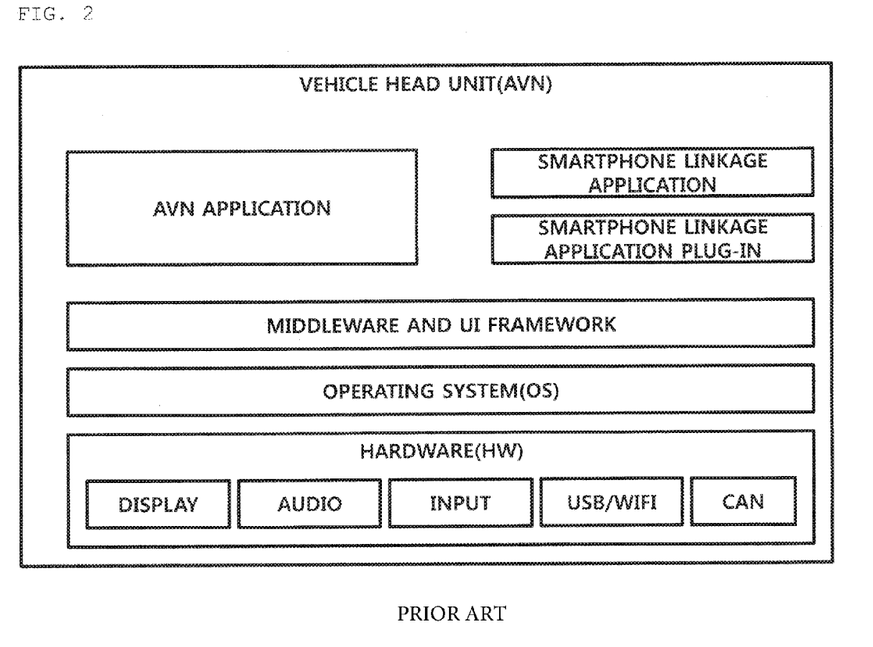
FIG. 2 is a block diagram illustrating a hierarchical structure of an AVN system implemented to provide a function of linking a vehicle AVN system and a smartphone according to the related art.

However, current individual standards of IT companies such as CarPlay of Apple and Android Auto of Google are implemented only using documents provided by the respective companies, and thus may not be applied to the vehicle AVN system. As such, the SW plug-in that operates by being mounted in the AVN system has been provided other than a basic technical specification. A vehicle developer has been implementing the function of linking the vehicle AVN system and the smartphone by installing the SW plug-in in the AVN system and connecting the SW plug-in to an application layer. FIG. 2 illustrates a hierarchical structure of a conventional AVN system implemented to provide the function of linking the vehicle AVN system and the smartphone. As illustrated in FIG. 2, a smartphone linkage application mounted in the conventional AVN system has shared an OS and a hardware resource in addition to middleware and a user interface framework with an AVN application without a separate restriction. Therefore, there has been a problem in that, when the OS malfunctions due to the smartphone linkage application, the AVN application cannot be used either. In addition, there has been a problem of poor security in a vehicle since the smartphone linkage application shares a hardware resource such as a controller area network (CAN) without a separate restriction.

In particular, referring to the function of linking the vehicle AVN system and the smartphone, due to different characteristics between the smartphone which puts emphasis on convenience/availability and the vehicle which puts emphasis on safety, respectively, vehicle safety may be endangered if the smartphone linkage application shares AVN hardware without a separate restriction even when the vehicle requires a higher level of safety than the smartphone.

For example, while the smartphone functions as a guide, the smartphone may abruptly crash and not function or abruptly malfunction while making a strange noise, or a whole screen may become black and not be restored. More seriously, the OS of the AVN system may be in an unrecoverable state, and may not operate until a driver restarts the vehicle. The driver may be distracted due to these problems during driving, which may be fatal to safe driving.

SUMMARY

Accordingly, the present disclosure is directed to a method and apparatus for providing a linking service between a vehicle AVN system and a smartphone based on a virtualization framework that substantially obviates one or more problems due to limitations and disadvantages of the related art.

Another object of the present disclosure is to provide a method and apparatus for providing a linking service between a vehicle AVN system and a smartphone based on a virtualization framework capable of preventing an unnecessary vehicle hardware resource from being accessed by a smartphone linkage application through virtualization of only a minimum hardware resource for the smartphone linkage application.

Another object of the present disclosure is to provide a method and apparatus for providing a linking service between a vehicle AVN system and a smartphone based on a virtualization framework capable of detecting an abnormal operation of a function of linking the vehicle AVN system and the smartphone in real time to safely restore the function based on the virtualization framework.

Technical problems to be solved by the present disclosure are not limited to the above-mentioned technical problems, and other technical problems not mentioned herein may be clearly understood by those skilled in the art from description below.

The present disclosure provides a method and apparatus for providing a linking service between a vehicle AVN system and a smartphone based on a virtualization framework.

To achieve these objects and other advantages and in accordance with the purpose of the disclosure, as embodied and broadly described herein, an apparatus for providing a linking service between a vehicle audio video navigation (AVN) system and a smartphone, includes a host operating system for managing an operation and a state of a host process and AVN application, and managing hardware resources included in the apparatus for the host process and AVN application, a guest operating system for managing an operation and a state of a guest process/the smartphone linkage application, and a hypervisor for emulating the hardware resources according to a control signal of the host operating system to allocate a virtualized hardware resource to the guest operating system.

Here, the hypervisor may virtualize a hardware resource to be used for an operation of the guest process/smartphone linkage application among the hardware resources included in the apparatus to allocate the virtualized hardware resource to the guest operating system.

In this instance, the virtualized hardware resource may include at least one of a display resource, an input resource, an audio resource, a universal serial bus (USB) resource, and a Wi-Fi resource.

In addition, a resource related to vehicle security among the hardware resources included in the apparatus may not be virtualized by the hypervisor.

In addition, the hardware resource not virtualized includes a controller area network (CAN) communication resource.

In addition, the apparatus may further include a guest operating system monitoring module included in the host operating system to monitor an operation state of the guest operating system, wherein the hypervisor may transmit a predetermined error notification message to the guest operating system monitoring module through the host operating system when an error or a failure is detected from the guest operating system.

In addition, the guest operating system monitoring module may transmit a predetermined control signal to the hypervisor through the host operating system when the error notification message is received, wherein the hypervisor reboots the guest operating system according to the control signal.

In addition, the guest operating system may automatically perform a predetermined recovery procedure for at least one of the guest process and the smartphone linkage application when an error is detected from the operation of at least one of the guest process and the smartphone linkage application, wherein the guest operating system may generate a predetermined error notification message and transmit the generated message to the host operating system through the hypervisor when the recovery procedure is not normally completed.

In addition, the guest operating system may be rebooted by transmitting a predetermined control signal to the hypervisor when the host operating system receives the error notification message.

In another aspect of the present disclosure, a method of providing a linking service between a vehicle AVN system and a smartphone through a virtualization framework in the vehicle AVN system, the vehicle AVN system including a host operating system and a guest operating system separated from each other, includes virtualizing a hardware resource to be used by the guest operating system among hardware resources included in the AVN system by a hypervisor executed according to a predetermined control signal of the host operating system when the AVN system is driven, monitoring, by the guest operation system, an operation state of a guest process/smartphone linkage application included in the guest operating system, and recovering at least one of the guest process and the smartphone linkage application from an error when the error is detected from the operation state, the at least one of the guest process and the smartphone linkage application corresponding to the error, wherein the guest operating system transmits a predetermined error notification message to the host operating system through the hypervisor when the detected error is not recovered from.

Here, a hardware resource to be used for operations of the guest process and the smartphone linkage application among the hardware resources included in the apparatus may be virtualized and allocated to the guest operating system.

In addition, the virtualized hardware resource may include at least one of a display resource, an input resource, an audio resource, a universal serial bus (USB) resource, and a Wi-Fi resource.

In addition, a resource related to vehicle security among the hardware resources included in the AVN system may not be virtualized by the hypervisor.

Here, the hardware resource not virtualized may include a controller area network (CAN) communication resource.

In addition, the method may further include transmitting, by the hypervisor, a predetermined error notification message to a guest operating system monitoring module through the host operating system when an error or a failure is detected from the guest operating system, wherein the guest operating system monitoring module may be included in the host operating system to monitor an operation state of the guest operating system.

In addition, the method may further include transmitting a predetermined control signal to the hypervisor through the host operating system when the error notification message is received by the guest operating system monitoring module, and rebooting the guest operating system by the hypervisor according to the control signal.

In another aspect of the present disclosure, it is possible to provide a computer-readable recoding medium recording a program for executing any one of the methods of providing the linking service between the vehicle AVN system and the smartphone described above.

It should be noted that the above-mentioned technical solutions are merely a part of forms of the present disclosure, and various forms reflecting technical characteristics of the present disclosure may be derived and understood by those skilled in the art from detailed description of the present disclosure given below.

DRAWINGS

The accompanying drawings, which are included to provide a further understanding of the disclosure and are incorporated in and constitute a part of this application, illustrate form(s) of the disclosure and together with the description serve to explain the principle of the disclosure. In the drawings.

DETAILED DESCRIPTION

Reference will now be made in detail to an apparatus and various methods to which the preferred forms of the present disclosure are applied. The suffixes "module" and "unit" of elements herein are used for convenience of description and thus can be used interchangeably and do not have any distinguishable meanings or functions.

Although all elements constituting the forms of the present disclosure are described as being integrated into a single one or operated as a single one, the present disclosure is not necessarily limited to such forms. According to forms, all of the elements may be selectively integrated into one or more and be operated as one or more within the object and the scope of the present disclosure. Each of the elements may be implemented as independent hardware. Alternatively, some or all of the elements may be selectively combined into a computer program having a program module performing some or all functions combined in one or more pieces of hardware. Code and code segments constituting the computer program may be easily reasoned by those skilled in the art to which the present disclosure pertains. The computer program may be stored in computer readable media such that the computer program is read and executed by a computer to implement forms of the present disclosure. Computer program storage media may include magnetic recording media, optical recording media, and carrier wave media.

The term "comprises", "includes", or "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings in the related art from the context. Unless obviously defined in the present disclosure, such terms should not be interpreted as having ideal or excessively formal meanings.

It will be understood that, although the terms first, second, A, B, (a), (b), etc. may be used herein to describe various elements of the present disclosure, these terms are only used to distinguish one element from another element and essence, order, or sequence of corresponding elements are not limited by these terms. It will be understood that when one element is referred to as "connected to", "coupled to", or "accessing" another element, one element may be "connected to", "coupled to", or "access" another element via a further element although one element may be directly connected to or directly access another element.

Hereinafter, a detailed description will be given of a method and apparatus for providing a function of linking a vehicle AVN system and a smartphone based on a virtualization framework with reference to FIGS. 3 to 8.

Figure 3:
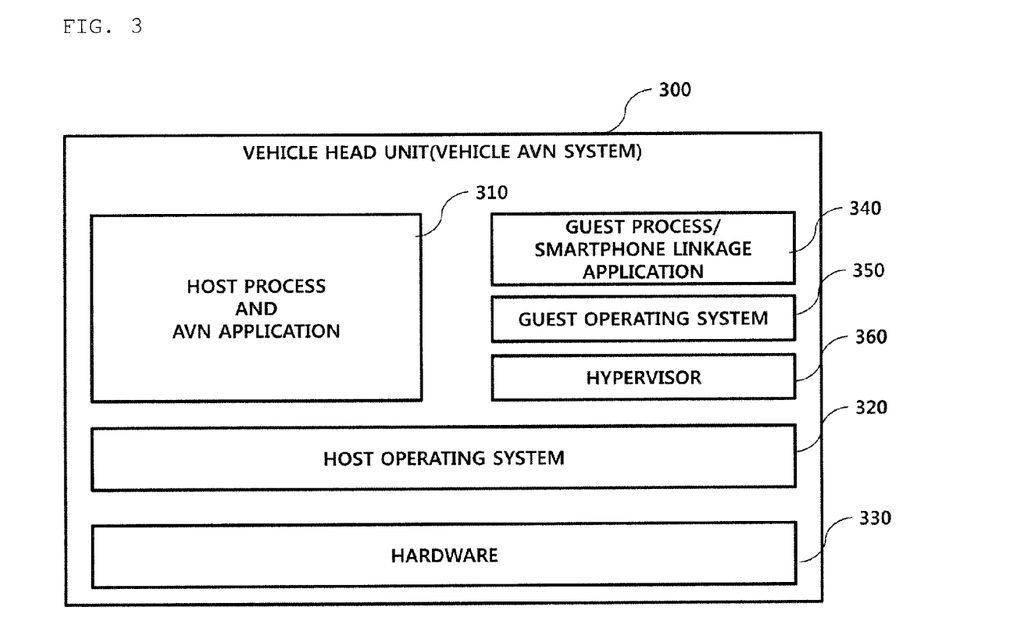
FIG. 3 is a block diagram illustrating a hierarchical structure of an AVN system implemented to provide a function of linking a vehicle AVN system and a smartphone.

FIG. 3 illustrates a hierarchical structure of an AVN system 300 implemented to provide the function of linking the vehicle AVN system and the smartphone.

Referring to FIG. 3, the AVN system 300 includes a host process and AVN application 310, a host operating system 320, hardware 330, a guest process/the smartphone linkage application 340, a guest operating system 350, and a hypervisor 360.

The host operating system 320 may manage an operation and a state of the host process and AVN application 310, and manage a user interface and a hardware resource for the host process and AVN application 310.

In addition, the host operating system 320 may monitor an operation state of the guest operating system 350 through a linkage with the hypervisor 360.

A physical resource, that is, a hardware resource is emulated through the hypervisor 360, which is platform virtualization software, and thus the guest process/the smartphone linkage application 340 and the guest operating system 350 may operate completely independently of the host process and AVN application 310.

In particular, in the AVN system 300 according to the present disclosure, while some physical hardware resources are shared between the host process and AVN application 310 and the guest process/the smartphone linkage application 340, hardware which is accessible by the guest operating system 350 may be virtualized by the hypervisor 360 and controlled to be accessed only by a minimum hardware resource which is not fatal to vehicle security.

The hypervisor 360 may emulate a resource of the hardware 330 for providing a linking service between the vehicle AVN system and the smartphone through the host operating system 320. In other words, the hardware resource may be virtualized by the hypervisor 360 such that the guest operating system 350 may access only a restricted hardware resource among resources of the hardware 330 of the AVN system 300.

In particular, the hypervisor 360 may maintain vehicle security by preventing hardware for in-vehicle communication such as a CAN from being used by the guest process/the smartphone linkage application 340. For example, the hypervisor 360 may exclude a CAN communication resource fatal to vehicle security from a virtualization resource, and include at least one of a display resource, an input resource, an audio resource, and a USB/Wi-Fi resource in the virtualization resource. However, this is merely an example, and it should be noted that the virtualization resource may be different according to a vehicle security policy of a vehicle OEM and a providable function of linking the vehicle AVN system and the smartphone.

In addition, the hypervisor 360 may be controlled by the host operating system 320. For example, the hypervisor 360 may be executed or terminated by the host operating system 320, and the host operating system 320 may monitor an operation state of the guest operating system 350 and an operation state of the guest process/the smartphone linkage application 340 operating on the guest operating system 350 through the hypervisor 360.

The guest operating system 350 may monitor an error, etc. of the guest process/the smartphone linkage application 340. When error occurrence is detected as a result of monitoring, the guest process/the smartphone linkage application 340 may be re-executed. When the guest process/the smartphone linkage application 340 is not normally re-executed, operation and execution of the guest process and/or the smartphone linkage application may be blocked.

Figure 4:
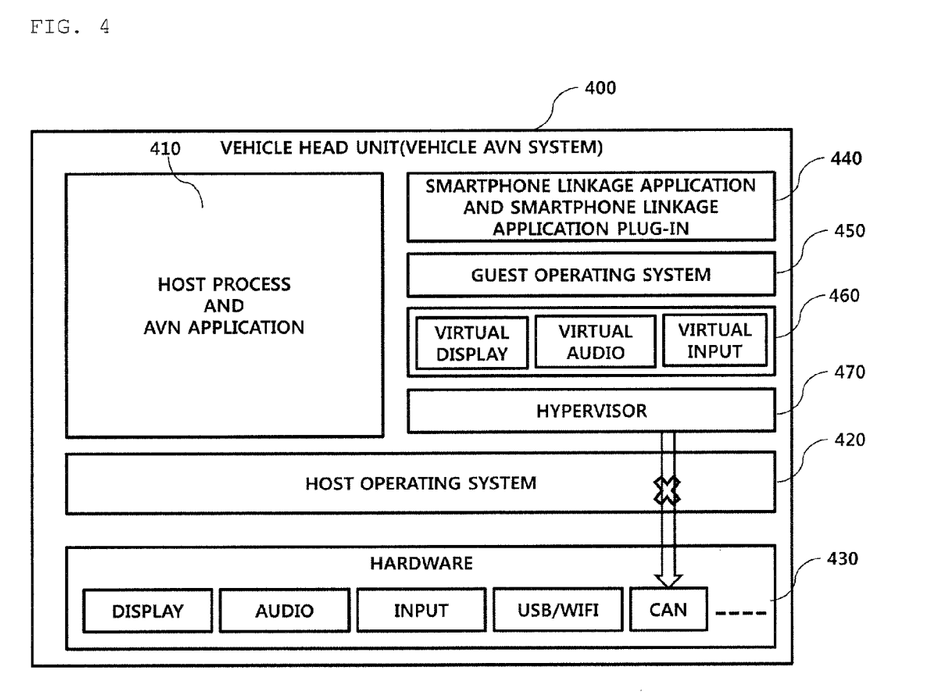
FIG. 4 is a block diagram illustrating a method of strengthening vehicle security through hardware resource virtualization.

FIG. 4 is a diagram for description of a method of strengthening vehicle security through hardware resource virtualization.

Referring to FIG. 4, an AVN system 400 according to the present form includes a host process and AVN application 410, a host operating system 420, hardware 430, a smartphone linkage application and smartphone linkage application plug-in 440, a guest operating system 450, virtual hardware 460, and a hypervisor 470.

When the hypervisor 470 is executed by the host operating system 420, the hypervisor 470 may emulate a minimum hardware resource accessible by the guest operating system 450 and provide the minimum hardware resource to the virtual hardware 460.

For example, the virtual hardware 460 provided by the hypervisor 470 may include a virtual display, virtual audio, a virtual input, etc. However, this is merely an example, and it should be noted that the virtual hardware 460 may be different according to a type of a smartphone linkage application included in the AVN system 400 and a hardware security policy of each vehicle OEM.

In particular, the hypervisor 470 may prevent vehicle security threat through the smartphone linkage application by restricting access to a hardware resource, which enables access to an electronic control device in the vehicle, such as a CAN by the guest operating system 450.

Figure 5:
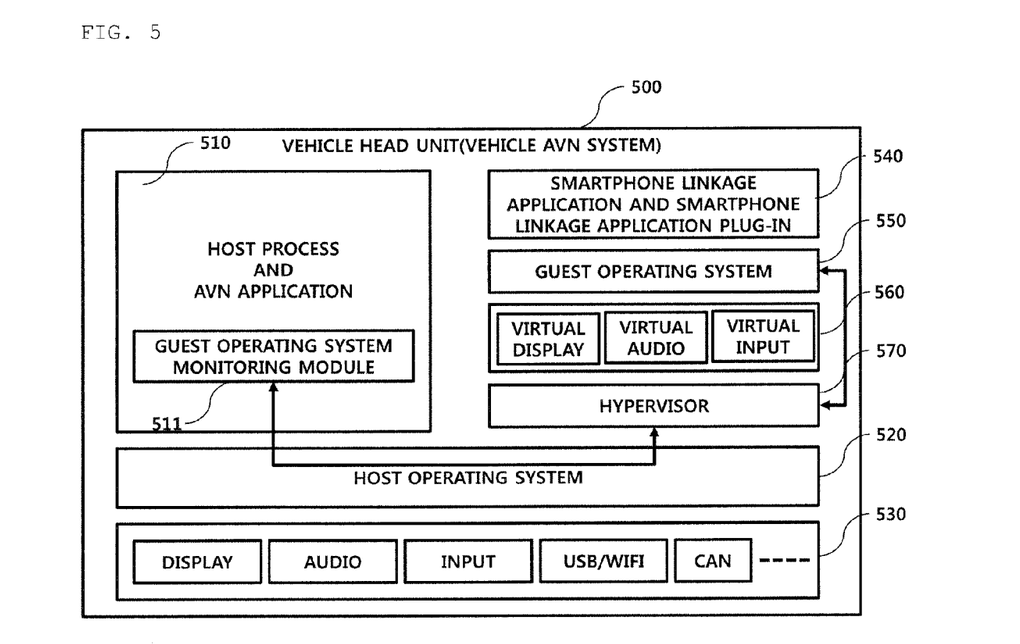
FIG. 5 is a block diagram for description of a method of restoring the function of linking the vehicle AVN system and the smartphone upon detection of an error based on a virtualization framework.

FIG. 5 is a diagram for description of a method of restoring a function of linking a vehicle AVN system and a smartphone upon detection of an error based on a virtualization framework.

Referring to FIG. 5, an AVN system 500 includes a host process and AVN application 510, a guest operating system monitoring module 511, a host operating system 520, hardware 530, a smartphone linkage application and smartphone linkage application plug-in 540, a guest operating system 550, virtual hardware 560, and a hypervisor 570.

The guest operating system monitoring module 511 is linked to the hypervisor 570 through the host operating system 520, and may monitor a state of the guest operating system 550 through the hypervisor 570 in real time.

The guest operating system 550 monitors an operation of a smartphone linkage application, and may restore a function by re-executing a corresponding guest process and/or the smartphone linkage application upon detection of an error, for example, a display malfunction such as a black screen, a stopped screen, etc., an audio malfunction such as an audio block, etc., and an input malfunction of an input means such as a touch pad/key button/jog wheel, etc. When the function is not restored to a normal state after re-execution is performed a predefined number of times, the guest operating system 550 may generate a predetermined error notification message indicating that the guest process and/or the smartphone linkage application cannot be executed and transmit the generated message to the hypervisor 570. Subsequently, the hypervisor 570 may deliver the error notification message to the guest operating system monitoring module 511 through the host operating system 520.

In addition, when an error is detected from an operation of the guest operating system 550, the hypervisor 570 may rerun the guest operating system 550. When the error is not recovered from after the guest operating system 550 is rerun a predetermined number of times, the hypervisor 570 may transmit a predetermined error notification message indicating that the guest operating system 550 cannot be run to the guest operating system monitoring module 511 through the host operating system 520.

According to another form of the present disclosure, when an error is detected from the operation of the guest operating system 550, the hypervisor 570 may immediately transmit an error notification message to the guest operating system monitoring module 511 through the host operating system 520. In this case, the guest operating system monitoring module 511 may transmit a predetermined control signal for rebooting the guest operating system 550 to the hypervisor 570 through the host operating system 520, and the hypervisor 570 may reboot the guest operating system 550 according to the received control signal. When the error of the guest operating system 550 is not recovered from after rebooting is performed a predetermined number of times, the guest operating system monitoring module 511 may perform a control operation such that execution of the smartphone linkage application is blocked in a vehicle head unit corresponding to the AVN system 500.

In addition, when execution of the smartphone linkage application is blocked, the AVN system 500 may transmit at least one of type and version information of the smartphone linkage application causing the error, type and version information of a plug-in for installing and removing the smartphone linkage application, and version information of the guest operating system 550 to a predetermined external server through an external communication means included in a vehicle, for example, a telematics communication module and a mobile communication module that supports a communication standard such as wideband code division multiple access (WCDMA), long term evolution (LTE)/LTE-advanced, WiMAX, vehicle to infrastructure (V2I) defined in a 3GPP standard, etc. In this instance, when software needs to be updated in response to the error, the external server may transmit the software to the AVN system 500 such that the software is updated.

Therefore, the AVN system 500 according to the present disclosure has an advantage of stably providing an AVN function irrespective of an error of the guest process and/or the smartphone linkage application and an error of the guest operating system 550, and has an advantage of strengthening vehicle security through virtualization of a minimum hardware resource for providing the function of linking the vehicle AVN system and the smartphone.

Figure 6:
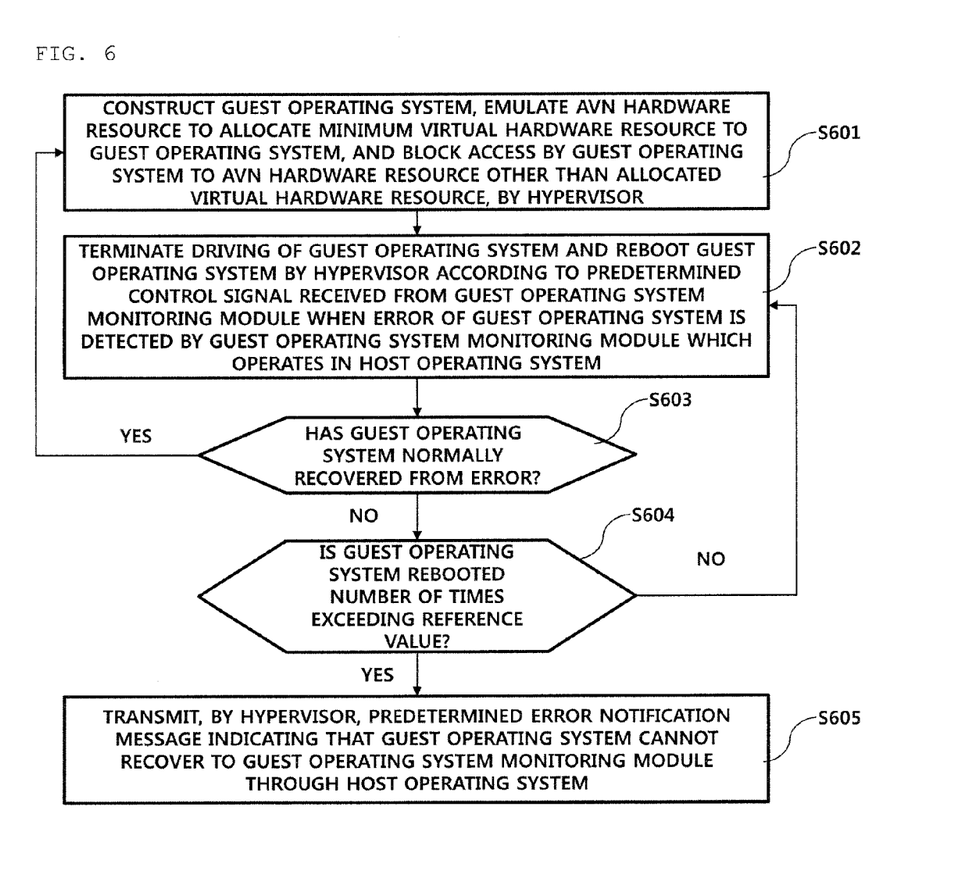
FIG. 6 is a flowchart for description of a method of providing the function of linking the vehicle AVN system and the smartphone in a hypervisor.

FIG. 6 is a flowchart for description of a method of providing a function of linking a vehicle AVN system and a smartphone in a hypervisor.

Referring to FIG. 6, in S601, the hypervisor may construct a guest operating system according to control of a host operating system, emulate an AVN hardware resource to allocate a minimum virtual hardware resource to the guest operating system, and block access by the guest operating system to the AVN hardware resource other than the allocated virtual hardware resource.

In S602, when an error (or failure) of the guest operating system is detected by a guest operating system monitoring module which operates in the host operating system, the hypervisor may terminate driving of the guest operating system and start a rebooting procedure of the guest operating system according to a predetermined control signal received from the guest operating system monitoring module.

After performing the rebooting procedure, the hypervisor may verify whether the guest operating system has normally recovered from the error in S603. In this instance, when the guest operating system has not normally recovered from the error, the hypervisor may repeatedly perform the rebooting procedure of the guest operating system a predetermined number of times.

When the guest operating system has normally recovered from the error as a result of verification in S603, the hypervisor may return to S601.

In S604 and S605, when the guest operating system is rebooted a number of times exceeding a predetermined reference value, the hypervisor may transmit a predetermined error notification message indicating that the guest operating system cannot recover to the guest operating system monitoring module through the host operating system. In this instance, the guest operating system monitoring module may perform a control operation such that the guest operating system is driven again by rerunning the hypervisor in response to reception of the error notification message.

Figure 7:
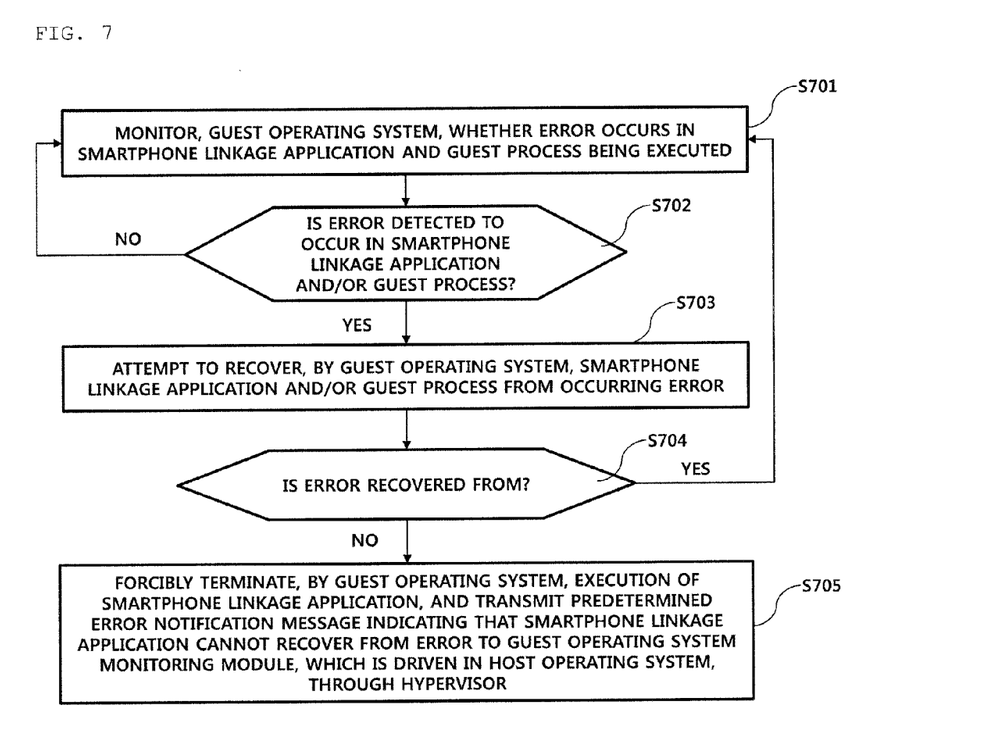
FIG. 7 is a flowchart for description of a method of providing the function of linking the vehicle AVN system and the smartphone in a guest operating system.

FIG. 7 is a flowchart for description of a method of providing a function of linking a vehicle AVN system and a smartphone in a guest operating system.

Referring to FIG. 7, in S701, the guest operating system may monitor whether an error occurs in a smartphone linkage application or a guest process being executed in real time (or periodically).

In S702 and S703, when an error is detected to occur in the smartphone linkage application or the guest process, the guest operating system may recover the smartphone linkage application and/or the guest process from the occurring error.

In S704 and S705, when error recovery is not normally performed, the guest operating system may forcibly terminate execution of the smartphone linkage application and/or the guest process, and transmit a predetermined error notification message indicating that the smartphone linkage application and/or the guest process cannot recover from the error to a guest operating system monitoring module, which is driven in a host operating system, through a hypervisor.

When error recovery is normally performed in S704, the guest operating system may return to S701.

As illustrated in FIG. 7, the present disclosure has an advantage of continuously providing an existing AVN function by separately operating the host operating system and the guest operating system through platform virtualization, thereby allowing the host operating system to be normally driven even when a serious error occurs in the function of linking the vehicle AVN system and the smartphone.

Further, the present disclosure has an advantage of effectively preventing a driver from being distracted due to an error of the smartphone linkage application by a guest operating system monitoring module, which operates in the host operating system, monitoring an operation state of the guest operating system in real time, and transmitting a predetermined control signal for automatically performing recovery again to the hypervisor through the host operating system when a serious error, from which the hypervisor or the guest operating system cannot recover, occurs.

Figure 8:
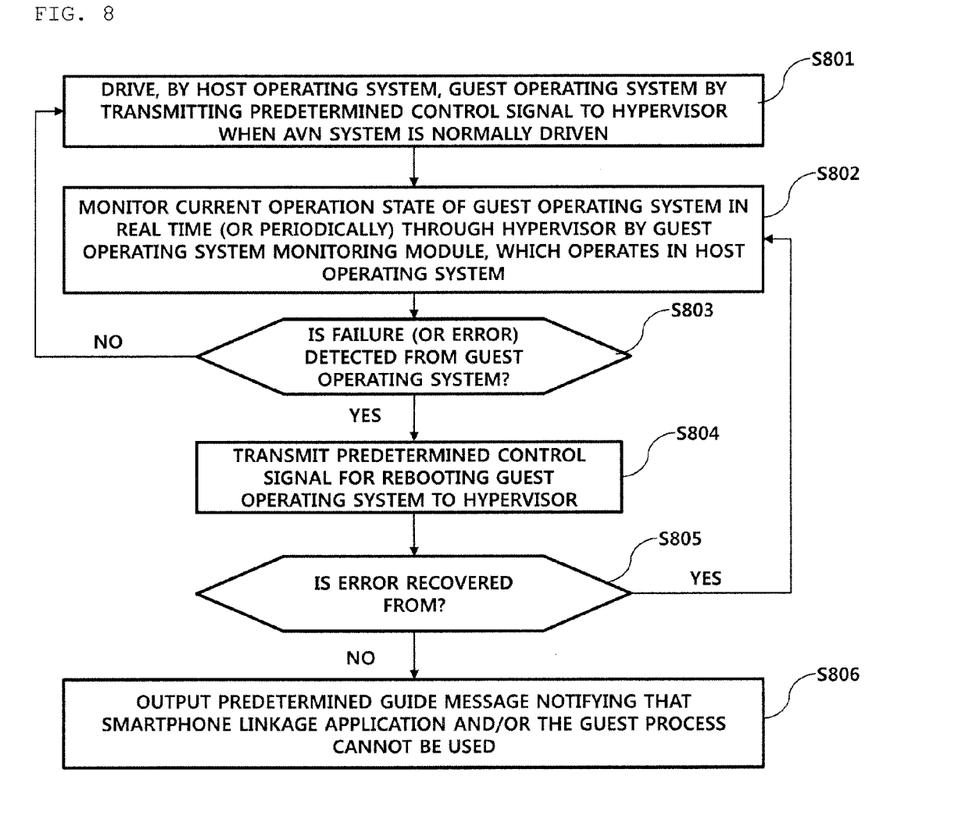
FIG. 8 is a flowchart for description of a method of providing the function of linking the vehicle AVN system and the smartphone in a host operating system.

FIG. 8 is a flowchart for description of a method of providing a function of linking a vehicle AVN system and smartphone in a host operating system.

Referring to FIG. 8, in S801, the host operating system may drive a guest operating system by transmitting a predetermined control signal to a hypervisor when the AVN system is normally driven. In this instance, the hypervisor may emulate a hardware resource of the AVN system to allocate a minimum virtual hardware resource for a smartphone linkage application and a guest process, that is, for an operation of the guest operating system.

In S802, a guest operating system monitoring module, which operates in the host operating system, may monitor a current operation state of the guest operating system in real time (or periodically) through the hypervisor.

In S803 and S804, when a failure or an error is detected from the guest operating system, the guest operating system monitoring module may transmit a predetermined control signal for rebooting the guest operating system to the hypervisor through the host operating system.

In S805 and S806, when the guest operating system does not normally recover from the failure or the error after being rebooted, the guest operating system monitoring module may perform a control operation such that a predetermined guide message notifying that the smartphone linkage application and/or the guest process cannot be used is output through a predetermined output means, for example, an AVN screen, a speaker, etc.

Effects of the method and apparatus according to the present disclosure are described below.

The present disclosure has an advantage of providing a method and apparatus for providing a linking service between a vehicle AVN system and a smartphone based on a virtualization framework.

In addition, the present disclosure has an advantage of providing a method and apparatus for providing a method and apparatus for providing a linking service between a vehicle AVN system and a smartphone based on a virtualization framework capable of strengthening vehicle security by preventing an unnecessary vehicle hardware resource from being accessed by a smartphone linkage application through virtualization of only a minimum hardware resource for the smartphone linkage application.

In addition, the present disclosure has an advantage of providing a method and apparatus for providing a linking service between a vehicle AVN system and a smartphone based on a virtualization framework capable of detecting abnormal operation of a function of linking the vehicle AVN system and the smartphone in real time to safely restore the function based on the virtualization framework.

In addition, the present disclosure has an advantage of effectively solving a problem, in which a whole AVN system becomes unavailable due to malfunction of a guest operating system, by separating the guest operating system, which provides a function of linking a vehicle AVN system and a smartphone, from a host operating system, which provides an existing AVN function.

Effects that may be obtained from the present disclosure are not limited to the above-mentioned effects, and other effects not mentioned herein may be clearly understood by those skilled in the art from the above description.

Those skilled in the art will appreciate that the present disclosure may be carried out in other specific ways than those set forth herein without departing from the spirit and essential characteristics of the present disclosure.

The above exemplary forms are therefore to be construed in all aspects as illustrative and not restrictive. The scope of the disclosure should be determined by the appended claims and their legal equivalents, not by the above description, and all changes coming within the meaning and equivalency range of the appended claims are to be embraced therein.

What is claimed is:

1. An apparatus for providing a linking service between a vehicle audio video navigation (AVN) system and a smartphone, comprising:
   a host operating system configured to manage an operation and a state of a host process, manage an operation and a state of an AVN application, and manage hardware resources included in the apparatus for implementing the host process and the AVN application;
   a guest operating system configured to manage an operation and a state of a guest process, manage an operation and a state of a smartphone linkage application, the smartphone linkage application configured to provide a communication link between the guest operating system and the smartphone; and
   a hypervisor configured to:
      receive a control signal from the host operating system;
      selectively emulate a non-security hardware resource from the hardware resources into a virtualized hardware resource based on the control signal, wherein the non-security hardware resource is predetermined by a vehicle security policy to include at least one of a display resource or an audio resource;
      selectively restrict emulating a security hardware resource from the hardware resources into the virtualized hardware resource based on the vehicle security policy, wherein the security hardware resource includes at least a vehicle controller area network (CAN) according to the vehicle security policy; and
      allocate the virtualized hardware resource to the guest operating system to be involved in the smartphone linkage application providing the communication link between the guest operating system and the smartphone.

2. The apparatus according to claim 1, wherein the virtualized hardware resource further includes at least one of a an input resource, a universal serial bus (USB) resource, or a Wi-Fi resource.

3. The apparatus according to claim 1, further comprising a guest operating system monitoring module included in the host operating system, the guest operating system monitoring module configured to monitor an operation state of the guest operating system; and
   wherein the hypervisor is configured to transmit a predetermined error notification message to the guest operating system monitoring module through the host operating system when an error or a failure is detected from the guest operating system.

4. The apparatus according to claim 3, wherein the guest operating system monitoring module is configured to transmit a predetermined control signal to the hypervisor through the host operating system when the error notification message is received; and
   wherein the hypervisor is configured to reboot the guest operating system based on the predetermined control signal.

5. The apparatus according to claim 1, wherein the guest operating system is configured to automatically perform a predetermined recovery procedure for at least one of the guest process or the smartphone linkage application when an error is detected from the operation of at least one of the guest process or the smartphone linkage application,
   wherein the guest operating system is configured to generate a predetermined error notification message and transmit the generated message to the host operating system through the hypervisor when the recovery procedure is not normally completed.

6. The apparatus according to claim 5, wherein the guest operating system is rebooted by transmitting a predetermined control signal to the hypervisor when the host operating system receives the error notification message.

7. A method of providing a linking service between a vehicle AVN system and a smartphone through a virtualization framework in the vehicle AVN system, the vehicle AVN system including a host operating system and a guest operating system separated from each other, the method comprising:
   receiving, by a hypervisor, a predetermined control signal from the host operating system when the vehicle AVN system is driven;
   selectively virtualizing a non-security hardware resource from the hardware resources by emulating the non-security hardware resource into a virtualized hardware resource, wherein the non-security hardware resource is predetermined by a vehicle security policy to include at least one of a display resource or an audio resource;
   selectively restricting virtualizing a security hardware resource from the hardware resources into the virtualized hardware resource based on the vehicle security policy, wherein the security hardware resource includes at least a vehicle controller area network (CAN) according to the vehicle security policy;
   allocating the virtualized hardware resource to the guest operating system to be involved in a smartphone linkage application providing a communication link between the guest operating system and the smartphone, wherein the smartphone linkage application is included in the guest operating system;
   monitoring, by the guest operation system, an operation state of a guest process and the smartphone linkage application; and
   recovering at least one of the guest process or the smartphone linkage application from an error when the error is detected from the operation state of the guest process and the smartphone linkage application, wherein at least one of the guest process or the smartphone linkage application corresponds to the error,
   wherein the guest operating system transmits a predetermined error notification message to the host operating system through the hypervisor when the detected error is not recovered.

8. The method according to claim 7, wherein the virtualized hardware resource includes at least one of an input resource, a universal serial bus (USB) resource, and a Wi-Fi resource.

9. The method according to claim 7, further comprising
transmitting, by the hypervisor, a predetermined error notification message to a guest operating system monitoring module through the host operating system when an error or a failure is detected from the guest operating system; and
wherein the guest operating system monitoring module is included in the host operating system to monitor an operation state of the guest operating system.

10. The method according to claim 9, further comprising:
transmitting a predetermined control signal to the hypervisor through the host operating system when the error notification message is received by the guest operating system monitoring module; and
rebooting the guest operating system by the hypervisor based on the predetermined control signal.

11. A computer-readable non-transitory recoding medium having stored thereon a computer program providing a linking service between a vehicle AVN system and a smartphone through a virtualization framework in the vehicle AVN system, the computer program being executable by a machine for causing the machine to perform a method comprising:
receiving, by a hypervisor, a predetermined control signal from the host operating system when the vehicle AVN system is driven;
selectively virtualizing a non-security hardware resource from the hardware resources by emulating the non-security hardware resource into a virtualized hardware resource, wherein the non-security hardware resource is predetermined by a vehicle security policy to include at least one of a display resource or an audio resource;
selectively restricting virtualizing a security hardware resource from the hardware resources into the virtualized hardware resource based on the vehicle security policy, wherein the security hardware resource includes at least a vehicle controller area network (CAN) according to the vehicle security policy;
allocating the virtualized hardware resource to the guest operating system to be involved in a smartphone linkage application providing a communication link between the guest operating system and the smartphone, wherein the smartphone linkage application is included in the guest operating system;
monitoring, by the guest operation system, an operation state of a guest process and the smartphone linkage application; and
recovering at least one of the guest process or the smartphone linkage application from an error when the error is detected from the operation state of the guest process and the smartphone linkage application, wherein at least one of the guest process or the smartphone linkage application corresponds to the error,
wherein the guest operating system transmits a predetermined error notification message to the host operating system through the hypervisor when the detected error is not recovered.

12. The medium according to claim 11, wherein the virtualized hardware resource includes at least one of an input resource, a universal serial bus (USB) resource, and a Wi-Fi resource.

* * * * *